United States Patent
Grulke

[15] 3,652,339
[45] Mar. 28, 1972

[54] REGENERATIVE LIME SHEET FOR USE IN PRIMARY GALVANIC BATTERIES EMPLOYING A ZINC ANODE

[72] Inventor: Carl A. Grulke, Berea, Ohio
[73] Assignee: Union Carbide Corporation
[22] Filed: Oct. 6, 1969
[21] Appl. No.: 870,833

Related U.S. Application Data

[62] Division of Ser. No. 659,810, Aug. 10, 1967, Pat. No. 3,497,391.

[52] U.S. Cl................................136/161, 136/154, 136/164, 106/119
[51] Int. Cl.....................................H01m 33/00, C04b 1/00
[58] Field of Search...........................136/136, 164, 154, 161; 106/118, 119

[56] References Cited

UNITED STATES PATENTS

| | | | |
|---|---|---|---|
| 2,180,839 | 11/1939 | Schumacher et al. | 136/136 |
| 2,180,955 | 11/1939 | Heise et al. | 136/136 |
| 2,450,472 | 10/1948 | Dunham et al. | 136/164 |
| 2,460,571 | 2/1949 | Chaffee | 106/119 |

*Primary Examiner*—Donald L. Walton
*Attorney*—Paul A. Rose, John F. Hohmann and John R. Doherty

[57] ABSTRACT

For use as the regenerative lime material in an alkaline primary galvanic battery of the type employing a zinc anode, a thin porous regenerative lime sheet comprising colloidal lime particles and dispersed cellulose fibers bonded together with an organic binder insoluble in the alkaline electrolyte of the battery.

16 Claims, 4 Drawing Figures

PATENTED MAR 28 1972

INVENTOR.
CARL A. GRULKE
BY
ATTORNEY

REGENERATIVE LIME SHEET FOR USE IN PRIMARY GALVANIC BATTERIES EMPLOYING A ZINC ANODE

This application is a division of application Ser. No. 659,810, filed Aug. 10, 1967, and now U.S. Pat. No. 3,497,391.

The present invention relates to the regeneration of alkaline electrolytes in primary galvanic batteries of the type employing a zinc anode. More specifically, the invention concerns a novel and improved regenerative lime material for use in precipitating dissolved zinc from the alkaline electrolyte of a conventional type of air-depolarized primary battery, and to a process for preparing the regenerative lime material.

In the conventional type of air-depolarized primary battery employed a zinc anode, the electrolyte is an alkaline solution such as potassium or sodium hydroxide. During discharge of the battery, the electrolyte is gradually exhausted by chemical combination with the zinc anode. As discharge proceeds, there is a buildup of dissolved zinc within the electrolyte which may reach a high level. Because of this buildup of dissolved zinc and the consequent electrolyte depletion, the voltage level and efficiency of the battery may be seriously affected.

It has long been recognized that lime, i.e., slaked lime (calcium hydroxide), is an effective regenerative agent for the precipitation of dissolved zinc from the alkaline electrolyte of a wet-type alkaline primary galvanic battery employing either an air-depolarized or copper oxide cathode and a zinc anode. This basic concept of employing a regenerative lime material within the electrolyte was first disclosed in U.S. Pat. No. 1,833,867 and 1,864,652 to Heise and is still widely used today in the battery industry. Subsequent work in this field has lead to the development of several different forms of the regenerative lime material. For example, in U.S. Pat. No. 2,180,955 to Heise and Schumacher, there is disclosed a lime material in the form of a briquet or lime cake for use as the regenerative agent in an air-depolarized primary battery. The lime briquet or so-called "X-cake" was made by molding the lime particles together with a bonding agent and swellable fibers. The swellable fibers served as so-called "extending agents" for the briquet. The briquet offered the advantage in that considerably more of the lime material could be incorporated within a given volume of the battery.

Another type of lime material that has been widely used is disclosed in U.S. Pat. No. 2,450,472. This material consisted of lime particles bonded together to form small rigid, permeable granules about one-eighth inch in diameter. The binder used for the lime particles may be any one of a number of electrolyte insoluble and chemically non-reactive materials. Examples of suitable binder materials include sodium silicate or sodium zincate for permanent cementing effect and atmospheric carbon dioxide which reacts with moist lime to produce some calcium carbonate as a bonding agent. Organic binders such as polystyrene, polyethylene, polyvinyl resins and the like have also been used as the binder material. The preferred binder material is calcium chloride which was used in proportions of approximately 100 grams of calcium chloride to 1 liter of water. The mixture was added to the lime particles as the moistening agent and produced an oxychloride cement by chemical combination with the lime which served as the bonding agent.

While these prior art forms of regenerative lime material have generally proven effective for precipitating dissolved zinc from the alkaline electrolyte of primary galvanic batteries, it has been found nevertheless that these forms of regenerative lime material are subject to certain limitations and consequently they have not proven entirely satisfactory. One serious limitation resides in the fact that due to their relatively large size or dimension and in particular the thickness of the lime briquet and diameter of the lime granules, a substantial portion of the regenerative lime is rendered inaccessible for reaction with the zinc in the electrolyte. This is so since the reaction product between the zinc and the lime forms on the surface of the regenerative lime body and tends to block access to the innermost portion of the lime. Thus, it has not been heretofore possible to achieve maximum effective use of the available lime in the batteries.

It is an object of this invention to provide a novel and improved regenerative lime material for use in a primary galvanic battery of the type employing an alkaline electrolyte and a zinc anode.

More specifically, another object of this invention is to provide a novel and improved regenerative lime material which is capable of more efficiently precipitating dissolved zinc from the alkaline electrolyte of an air-depolarized primary battery.

Still another object of this invention is to provide a novel and improved process for preparing the regenerative lime material.

The foregoing and other objects of this invention are achieved by a novel and improved regenerative lime material provided in the form of a thin porous sheet. The lime sheet is composed of colloidal lime particles and dispersed cellulose fibers bonded together with a small amount of an organic binder which is insoluble but swellable to a controlled degree, in an alkaline electrolyte. The cellulose fibers serve as both a porosity-promoting diluent and support for the colloidal lime particles. Additionally, the fibers together with the swellable binder provide electrolyte access to the lime particle surfaces in all portions of the sheet.

Figure 1:
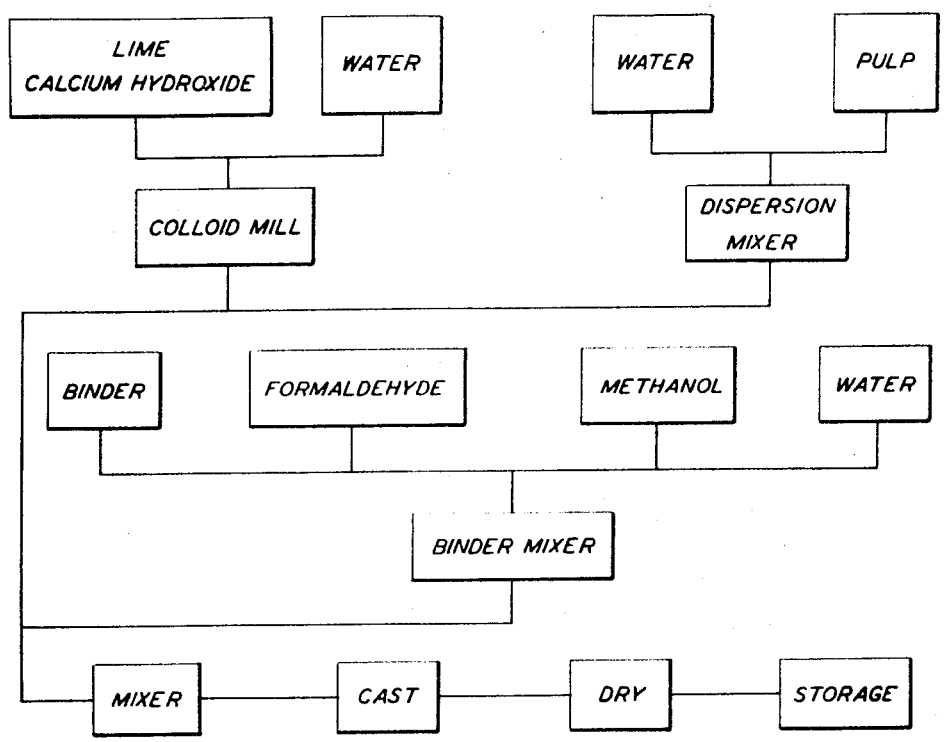
FIG. 1 is a flow diagram illustrating the steps in the preparation of the lime sheet of the invention.

The process for preparing lime sheets in accordance with the invention is illustrated in the flow diagram of FIG. 1. The lime sheets are prepared by blending a colloidal suspension of micromilled lime with dispersed cellulose pulp, preferably a sulfate process pulp, together with a small amount of an organic binder. A preferred organic binder is hydroxyethylcellulose insolubilized in alkaline solution by a suitable aldehyde or methylol treatment. The organic binder is added to the blend in order to improve the adhesion between the colloidal lime particles and the cellulose fibers and to thus effectively increase the strength of the finished lime sheets. The thus formed slurry is then formed or cast into thin porous sheets which are subsequently dried and cut to the finished dimensions desired. Optionally, the formed sheets may be cast directly to the necessary dimensions for incorporation into the battery.

In the practice of the invention, it is important that the lime be first micromilled to an extremely fine particle size in order to effectively increase or maximize the available lime surface for reaction with the dissolved zinc in the electrolyte. Preferably, the particle size of the lime after milling is in the range of about 0.01 to about 0.1 micron. It is also essential that the lime sheets be formed or cast to a relatively thin dimension of the order of approximately one thirty-second to one-eighth inch in thickness. The thinness of the lime sheets is an important factor in promoting maximum effective use of the available lime.

Depending on the particular application, the composition of the finished dried lime sheet may vary in the ratio of approximately 75 to 95 percent lime and 5 to 25 percent cellulose fibers based on the weight of the finished sheet. The preferred range for the lime is between about 80 and 90 percent by weight of the sheet. Formulations containing as little as 10 percent lime may be useful under special conditions.

While the lower percentage of cellulose fiber to be used is not too critical so long as the physical integrity of the sheet can be maintained both during preparation of the sheet and during normal operation of the battery, high concentrations of the cellulose fiber above about 25 percent should generally be avoided since the larger amounts of cellulose may cause undesirable swelling when the sheets are placed in contact with the electrolyte of the battery. Additionally, the use of larger amounts of the fiber prevents incorporation of sufficient lime to operate the battery effectively under normal conditions. The finished lime sheet may contain a small amount of residual moisture generally not in excess of about 1 to 2 percent by weight.

The binder used in preparing the lime sheet must be stable in caustic solution, either potassium or sodium hydroxide. The binder may be defined as an initially water-dispersible resin insolubilized, as in the case of hydroxyethylcellulose, preferably through an aldehyde or methylol treatment to a controlled swellability. The ether linkage so formed is resistant to prolonged exposure to caustic. The preferred binder for preparing the lime sheet is insolubilized hydroxyethylcellulose. Other suitable binder materials which may be insolubilized in a similar manner include pre-cooked starch, polyacrylic acid, polyvinyl alcohol, polyvinyl formal, and polyacrylamide resin, for example. The preferred binder, i.e., insolubilized hydroxyethylcellulose, is employed in an amount of about 0.5 to about 2.5 percent based on the weight of lime employed.

The degree of binder swelling when in contact with the caustic electrolyte can be effectively controlled by the use of heat and by the addition of a cross-linking agent in the form of aldehydes. Suitable aldehydes include formaldehyde, glyoxal and α-hydroxyadipaldehyde. The preferred cross-linking agent for hydroxyethylcellulose is formaldehyde which is employed in amounts of between about 2 and 5 percent of a 36 percent aqueous solution based on the weight of the hydroxyethylcellulose binder. Higher concentrations of the cross-linking agent may be preferred A concentration as high as 1:1 ratio with the binder may be used if desired. Variations in the insolubilizing treatment may be made to correspond with the particular chemical structure of the selected binder.

Figure 2:
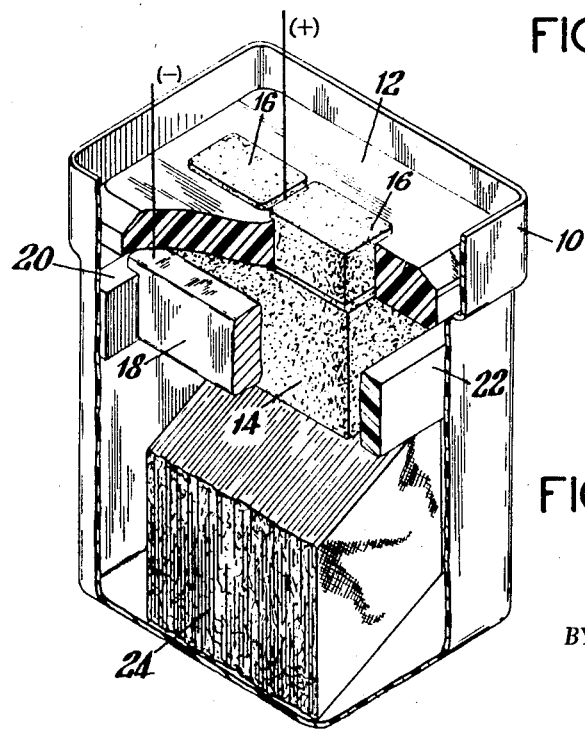
FIG. 2 is a perspective, partially cutaway view of a typical air-depolarized primary battery incorporating the lime sheets of the invention.

Referring now to FIG. 2 of the drawing, there is shown a typical air-depolarized battery embodying the invention. As shown, the battery has an outer rectangular casing 10 having an open end which is closed by a cover 12. The battery casing 10 and cover 12 are suitably made of a caustic resistant material such as an epoxy or vinyl resin, for example. Within the battery casing 10 is an air-depolarized carbon cathode 14 which is suitably activated by conventional methods known in the art. The carbon cathode 14 is mounted to the cover 12 and has a portion of its top surfaces protruding therethrough as at 16 in order to provide access of air to the activated surfaces of the cathode 14. Disposed on each side of the carbon cathode 14 is one of a pair of zinc anode bars, one of which is shown at 18. The anode bars 18 are suitably mounted at each end within a pair of anode supports 20, 22 provided on opposite sides of the battery casing 10. The anode supports 20, 22 are suitably made of a caustic resistant material. If desired, the anode supports 20, 22 may be integrally formed within the side walls of the battery casing 10. The battery casing 10 is filled with an alkaline electrolyte, suitably a 6.25 normal solution of potassium hydroxide.

In accordance with the invention, the air-depolarized primary battery is provided with a plurality of lime sheets as indicated at 24. The lime sheets 24 are stacked together and mounted within the battery with the flat surfaces thereof lying in a direction substantially perpendicular to the bottom of the battery casing 10. Preferably, as shown, the stack of lime sheets 24 are oriented diagonally within the battery casing 10 in order to provide for uniform circulation of the electrolyte around the edges and bottom of the sheets.

The following example illustrates in greater detail the process for preparing the lime sheets of the invention. The first step in the preparation of the lime sheets is micromilling of the lime to reduce its particle size and thereby increase its available surface area. Chemical grade lime is preferred. A 30 percent lime-in-water mixture is prepared and micromilled through a colloid mill. The initial viscosity of the mixture is about 500 centipoise. Milling action is terminated when the mixture reaches a viscosity of about 18,000 to 20,000 centipoise. During the milling operation, the temperature of the mixture will increase to about 175°F. to 190°F.

Cellulose pulp is next prepared by mixing dry cellulose fibers and water. The preferred pulp is a sulfate bleached pulp. In forming the pulp, the dry fibers should be beaten in the water mixture sufficiently to preclude the presence of coarse fibers. Excess water is then drained from the pulp. The pulp should not be too dry, however, so as to avoid agglomeration of the fibers during preparation of the pulp.

The binder is prepared by mixing the hydroxyethylcellulose with about 2 to 5 percent of a 36 percent solution of formaldehyde which is used as a cross-linking agent. Generally, about 18 milliliters of a 36 percent solution of formaldehyde in water may be used for a 50-pound batch of lime. The hydroxyethylcellulose is added in an amount of about 0.5 percent based on the weight of lime employed. The mixture is diluted with a 50-50 (by volume) methanol-water solution (approximately 1.5 liters are added per 225 grams of binder). The cross-linking agent should be thoroughly intermixed with the binder.

The colloidal lime suspension and cellulose pulp are then mixed together and agitated for a time sufficient to obtain an intimate mixture of the lime and fibers. The hydroxyethylcellulose binder as prepared above is then added and sufficient stirring is employed to obtain a smooth consistency within the mixture. The resultant blend is spread in a thin layer on a glass plate and then calendered in sheets which are subsequently dried, preferably in a $CO_2$-free atmosphere, in an oven at about 130°C. (preferably no higher than 138°C.) to remove all but a small amount of water and to set the binder. The flat surfaces of the sheets are preferably corrugated or otherwise roughened in order to expose more surface to the electrolyte. The sheets are then cut to fit the particular dimension of the battery. If the sheets are not to be used within a short period, they should preferably be stored in a $CO_2$-free atmosphere in order to avoid carbonate formation. Reaction of the portion of the lime in the sheets with $CO_2$ in the atmosphere will reduce the total lime available for reaction with the dissolved zinc and thus detract from the high efficiency exhibited by this form of regenerative lime material.

It will of course be obvious to one skilled in the art that variations in raw materials may occur which may necessitate certain changes in detailed process conditions in order to produce thin lime sheets having the desired characteristics of porosity, strength to withstand handling and storage, and resistance to degradation in the battery electrolyte.

To compare the performance of the lime sheets of the invention, a number of air-depolarized primary batteries of a construction similar to that illustrated in FIG. 2 were assembled employing either lime briquets, lime pellets or the lime sheets prepared in accordance with the invention. The batteries were assembled employing one activated carbon cathode, two zinc anodes and a 6.25 molar KOH electrolyte. The battery casing was made of a caustic resistant material, i.e., a vinyl resin, which was transparent so that the formation of precipitate and the blanketing of the lime by the precipitate could be observed. The lime briquets used in some of the batteries were provided in the form of relatively thick cakes of about one-fourth inch to one-half inch in thickness and were made by molding lime with wood floc or cellulose floc and cotton thread. The lime sheets were stacked vertically within the bottom of the battery casing and preferably in a position perpendicular to the plane of the electrode faces. About 50 lime sheets approximately 4½ by 5 by 1/16 inch and containing approximately 80 to 85 percent lime were employed. Each of the batteries assembled had exactly the same weight of zinc, lime and electrolyte. The total volume was substantially the same for all the batteries.

The air-depolarized primary batteries so assembled were then tested by subjecting each battery to one of two drain conditions, i.e., 600 milliamperes and 150 milliamperes, at substantially room temperature simulating the approximate conditions under which the batteries would normally be operated.

During the test, electrolyte solutions were sampled at every 100 ampere hours and the particular dissolved zinc concentration for each battery was then determined.

Figure 3:
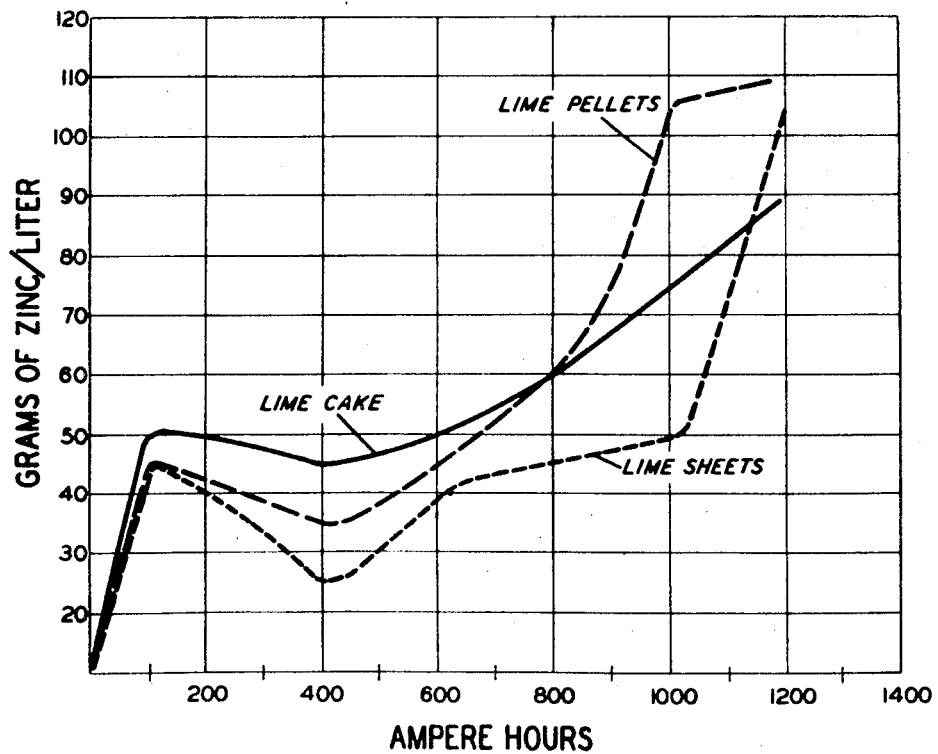
FIGS. 3 and 4 are graphs illustrating the comparative effectiveness of the lime sheets and known regenerative lime materials of the prior art.
Figure 4:
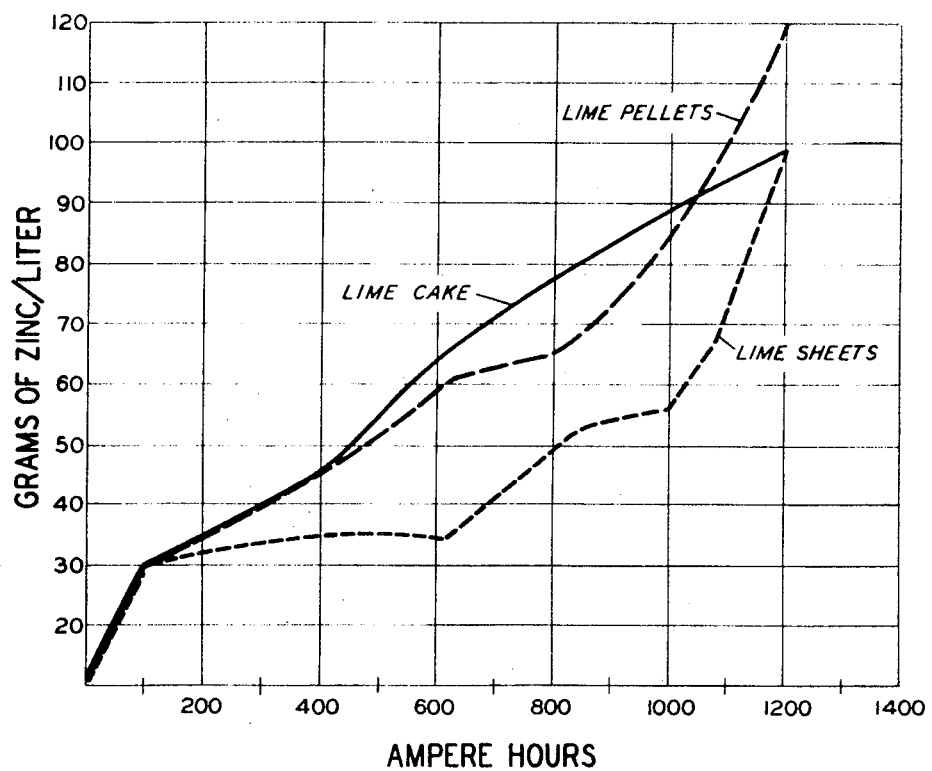

FIGS. 3 and 4 graphically depict the relative performances of the batteries tested. It will be readily seen from these curves that the concentration of zinc in the electrolyte is considerably less for the batteries employing the lime sheets of the invention. Thus it may be fairly concluded that under the particular test conditions, i.e., continuous drain at room temperatures, the lime sheets are far more efficient in precipitating dissolved zinc from the electrolyte solution of the batteries.

To further illustrate the effectiveness of the invention, another series of tests were conducted using identical air-depolarized batteries in which the total ampere hour capacity was recorded at the end of the useful life of the batteries. These discharge tests were conducted at a continuous drain of 600 milliamperes at room temperature and at 27°F. The results of the test are given in Tables I and II below:

TABLE I

| Lime Form | Ampere-Hour Capacity at 27° F. Ampere-Hours* |
|---|---|
| Cakes | 1319 |
| Pellets | 1214 |
| Sheets | 1703 |

*Average capacity of three batteries.

TABLE II

| Lime Form | Ampere-Hour Capacity at Room Temperature Ampere-Hours* |
|---|---|
| Cakes | 1266 |
| Pellets | 1603 |
| Sheets | 1573 |

From the above tables it will be seen that the air-depolarized batteries using the lime sheets of the invention averaged at least 25 percent more service, as expressed in terms of ampere hour capacity, than the batteries employing the lime cakes as the regenerative lime material. At a temperature of 27°F., the lime sheets produced substantially better performance than either the lime pellets or lime cakes of the prior art.

What is claimed is:

1. A thin porous regenerative lime sheet for use in an alkaline primary galvanic battery which comprises colloidal lime particles and dispersed cellulose fibers bonded together with an organic binder insoluble but swellable in alkaline solution, said cellulose fibers being present in an amount of up to about 25 percent by weight of the sheet.

2. A thin porous regenerative lime sheet for use in an alkaline primary galvanic battery which comprises colloidal lime particles of a size in the range of about 0.01 to about 0.1 micron and dispersed cellulose fibers bonded together with an organic binder insoluble but swellable in alkaline solution, said cellulose fibers being present in an amount of up to about 25 percent by weight of the sheet.

3. The regenerative lime sheet of claim 2 wherein the colloidal lime particles are present in an amount of from about 75 to 95 percent by weight of the sheet.

4. The regenerative lime sheet of claim 2 wherein the colloidal lime particles are present in an amount of from about 80 to 90 percent by weight of the sheet and wherein the insoluble swellable organic binder is present in an amount of about 0.5 to about 2.5 percent based on the weight of the line in said sheet.

5. The regenerative lime sheet of claim 4 wherein the insoluble swellable organic binder is selected from the group consisting of insolubilized hydroxyethylcellulose, precooked starch, polyacrylic acid, polyvinyl alcohol, polyvinyl formal and polyacrylamide resin.

6. The regenerative lime sheet of claim 5 wherein the insoluble swellable organic binder is insolubilized hydroxyethylcellulose.

7. A thin porous regenerative lime sheet for use in an alklaine primary galvanic battery which comprises from about 75 to 95 percent by weight colloidal lime particles of a size in the range of about 0.01 to about 0.1 micron and from about 5 to 25 percent by weight dispersed cellulose fibers bonded together with an insolubilized hydroxyethylcellulose binder in an amount of about 0.5 to about 2.5 percent based on the weight of lime in the sheet.

8. A process for forming a regenerative lime sheet for use in an alkaline primary galvanic battery, which comprises the steps of micromilling lime to an extremely fine particle size, preparing a colloidal suspension of the lime particles, blending the colloidal lime suspension with up to about 25 percent by weight of dispersed cellulose fibers based on the dry weight of the finished sheet together with an organic binder swellable in alkaline solution in an amount sufficient to bond the colloidal lime particles and cellulose fibers together in the finished sheet, casting the thus formed slurry into a thin porous sheet, drying the sheet to remove moisture therefrom and insolubilizing the binder.

9. The process of claim 8 wherein the colloidal lime particles are of a size in the range of about 0.01 to about 0.1 micron.

10. The process of claim 8 wherein the slurry is formed from about 75 to 95 percent by weight of colloidal lime particles and from about 10 to 25 percent by weight of cellulose fibers.

11. The process of claim 8 wherein the slurry is formed from about 80 to 90 percent by weight of colloidal lime particles, from about 10 to 20 percent by weight of cellulose fibers and about 0.5 to about 2.5 percent of the organic binder based on the weight of the lime particles present in the slurry.

12. The process of claim 11 wherein the organic binder is selected from the group consisting of hydroxyethylcellulose, precooked starch, polyacrylic acid, polyvinyl alcohol, polyvinyl formal and polyacrylamide resin.

13. The process of claim 12 wherein the binder is hydroxyethylcellulose.

14. The process of claim 12 wherein an aldehyde cross-linking agent is added to the slurry to control binder swelling.

15. The process of claim 14 wherein the cross-linking agent is selected from the group consisting of formaldehyde, glyoxal and α-hydroxyadipaldehyde.

16. The process of claim 14 wherein the cross-linking agent is formaldehyde in an amount of between about 2 and 5 percent of a 36 percent aqueous solution based on the weight of the hydroxyethylcellulose.

* * * * *